Figure 1:
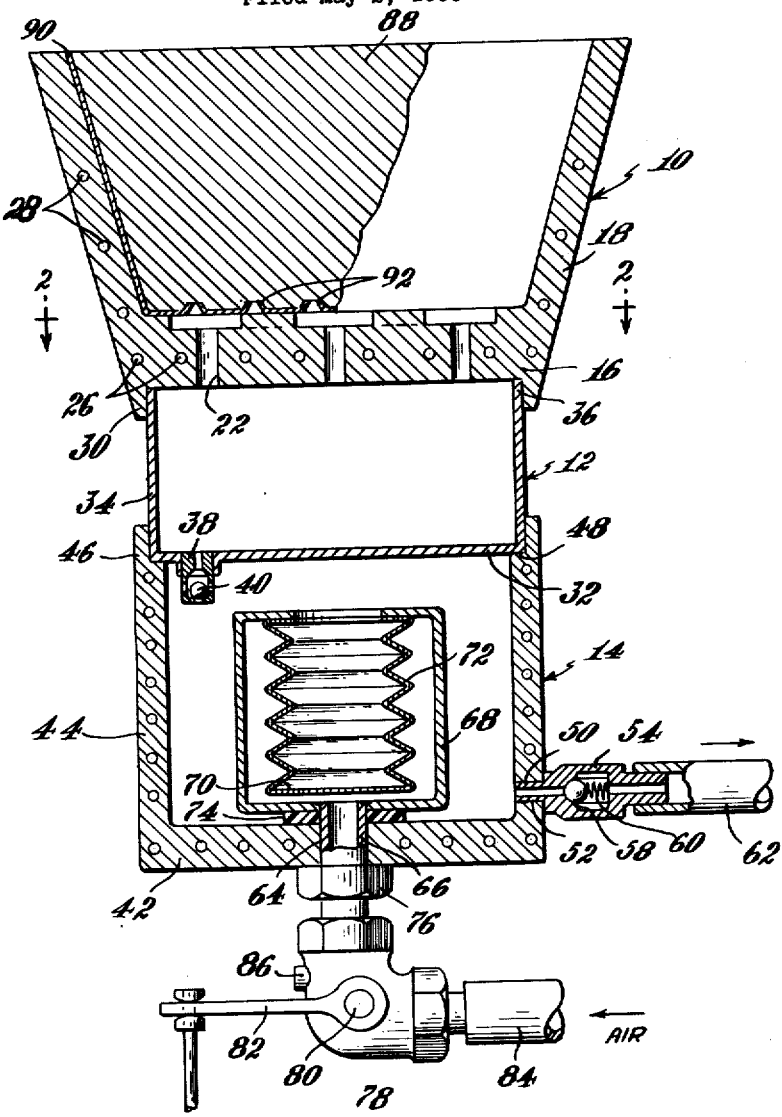

Oct. 15, 1957     T. A. WEISZ     2,809,772
APPARATUS FOR MELTING AND DISPENSING THERMOPLASTIC ADHESIVE
Filed May 2, 1955

Inventor
Thomas A. Weisz
by Roberts, Cushman & Grover
Att'ys

United States Patent Office 2,809,772
Patented Oct. 15, 1957

2,809,772

APPARATUS FOR MELTING AND DISPENSING THERMOPLASTIC ADHESIVE

Thomas A. Weisz, Plymouth, Mass., assignor, by mesne assignments, to Jacob S. Kamborian, West Newton, Mass.

Application May 2, 1955, Serial No. 505,105

5 Claims. (Cl. 222—146)

This invention relates to adhesive dispensing apparatus and more especially to apparatus for use in lasting machines for supplying liquid thermoplastic to the zone of lasting just before the lasting margin is laid down into contact with the shoe bottom.

The principal object of this invention is to provide an apparatus for melting thermoplastic adhesive and delivering it under pressure to an applicator nozzle which is located in a position to supply the liquid adhesive to the work with the least possible exposure to air thereby to minimize oxidation of the adhesive. Another object is to provide an apparatus in which substantially unexposed portions of a solid body of thermoplastic adhesive may be melted a little at a time collected in its liquid state and pumped under pressure to a place of use without danger of contaminating it with air. Another object is to provide an apparatus in which a melted body of adhesive may be maintained in liquid form and supplied to a place of use with the least possible danger of contamination with air. Still another object is to provide an apparatus which will supply the adhesive under pressure to an applicator without drip between successive deliveries of cement to the work. Other objects are to provide an apparatus which will supply an adequate quantity of liquid adhesive quickly when required, which is of simple and durable construction and can be easily cleaned.

As herein illustrated the apparatus has a melting chamber, a collecting chamber for melted adhesive and a discharge chamber from which the liquid adhesive is forceably ejected through a conduit to an applicator nozzle or equivalent device. The melting chamber is open at the top and is adapted to receive a solid body of adhesive shaped to fit closely within it. There is associated with the chamber heating means which supplies heat to the walls of the chamber to melt the surface of the adhesive having contact with the walls without melting the entire body of adhesive. The melted adhesive at the surfaces gravitate to the bottom of the chamber substantially unexposed to air and flows through perforations in the bottom into the collection chamber. A normally open check valve is located between the collection chamber and the discharge chamber through which liquid gravitating into the collection chamber drains into the discharge chamber. The discharge chamber is closed except for the aforesaid valve and a second normally closed check valve which will open under pressure from within the chamber to permit adhesive to be forced therefrom through a conduit connected for this purpose to the chamber at the valve and from thence to a suitable applicator. There is also in the discharge chamber a diaphragm pump which may be a bellows type element operable by collapse to raise the pressure in the discharge chamber thereby discharge adhesive through the valve. The bellows is a metal element normally held expanded by its inherent elasticity and is collapsible by admission of air to an end of it through a port in the wall of the discharge chamber. Air is admitted to the port by a conventional valve and air supply line and similarly cut off. A bleeder port built into the valve permits the residual pressure to fall when the air is cut off thereby to permit the diaphragm to expand.

Figure 2:
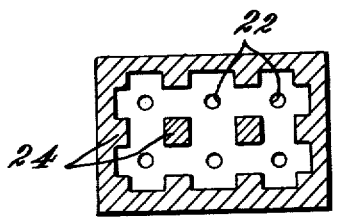

The invention will now be described in greater detail with reference to the accompanying drawings wherein:

Fig. 1 is a vertical section through the apparatus; and
Fig. 2 is a plan view of the bottom of the melting pot taken on the line 2—2 of Fig. 1.

Referring to the drawings the apparatus comprises a melting chamber 10, a collection chamber 12 and a discharge chamber 14 arranged one below the other. The melting pot has a thick bottom 16, herein shown as being substantially rectangular, and upwardly diverging walls 18. The top of the pot is open. The bottom 16 has through it a plurality of vertically disposed drain holes 22 or passages which lead from the inside of the melting pot through the bottom to the collecting chamber therebelow. A plurality of blocks 24 are distributed over the bottom and above the open ends of the passages 22 on which to support the block of solid adhesive in the pot during melting without blocking the passages. The bottom and walls have embedded therein one or more electric heating elements or coils 26 and 28 for supplying heat to both the bottom and walls.

While the component parts of the apparatus may be assembled in any convenient fashion, as illustrated herein the bottom of the melting pot has a downwardly extending flange 30 adapted to fit over the collecting chamber 12. The latter has a bottom 32, walls 34 and an open-top rim 36 which fits snugly within the flange 30. The bottom 32 of the collection chamber has in it a check valve 38 containing a ball 40. The ball normally gravitates to an open position by reason of its weight; however if pressure above atmospheric pressure is present in the subjacent discharge chamber the ball will close.

The discharge chamber has a bottom 42, walls 44 and an open top 46, internally of which there is a shoulder 48 adapted to receive the bottom of the chamber 12. Near the bottom of the chamber 14 there is a port 50 into which there is threaded from externally of the chamber the nipple 52 of a check valve 54 in which there is a ball 58 held in closed position by a spring 60. The valve has connected to it a conduit 62 for conducting adhesive discharged through the port and valve to a suitable applicator. Normally the ball 58 is held closed until the pressure within the chamber 14 exceeds the spring pressure whereupon it opens to allow adhesive to be discharged through the conduit 62.

The liquid adhesive is discharged from the chamber 14 by pressure supplied by movement of a diaphragm in the chamber which is arranged in such a way that it is impossible for air to enter the chamber. To this end, as illustrated, the bottom wall 42 has an opening 64 through which passes a length of pipe 66 having fastened to its inner end a housing 68 open at the top, within which is a diaphragm 70 supported by the lower end of a bellows type collapsible wall 72 preferably made of stainless steel having a natural elasticity which returns it to its extended position after collapsing pressure is removed. The upper end of the wall 72 is welded about the rim of the opening at the top of the housing. Thus, the interior of the bellows tube and diaphragm is open to the interior of the chamber while the exterior of the bellows tube and diaphragm is exposed only to the interior of the housing. A gasket 74 is located between the bottom of the housing and the bottom of the chamber about the pipe 66 and a nut 76 is threaded onto the pipe externally of the chamber to hold the housing securely in place. The pipe 66 has on its external portion a valve 78 with spindle 80 operable to open and close it. Conveniently, a lever 82 is provided for turning the spindle to admit air from a conduit 84. A bleeder 86 at the side of the valve next to the pipe 66 permits air behind the diaphragm to leak out when the valve is closed to shut off air pressure from the conduit 84 thereby to permit the bellows to expand.

In accordance with the practice described in my copending application, Serial No. 473,169, filed December 6, 1954, a solid body of adhesive 88 enclosed except for its top part in a sheet metal container 90 of a shape to fit into the melting pot is used to supply adhesive for this apparatus. As in the aforesaid application the bottom of the container 90 is first perforated by making a plurality of holes 92 therein and then the container with the adhesive in it is placed in the melting pot so that its bottom rests on the blocks 24. Heat is then supplied to the pot through the coils 26 and 28 to cause the surface portion of the adhesive next to the walls 18 to melt and flow downwardly within the container 90 through the perforations 92 and from thence through the passages 22 into the chamber 12. The bottom of the pot is kept hot by the coil 26 so as to keep the adhesive fluid thereby to insure free flow into the chamber 12. Very little air can gain entrance to the chamber 12 through the passages 22 for the reason that the surfaces only of the block of adhesive melt and the block itself serves as a closure or stopper settling within its container 90 as it melts. The melted adhesive within the chamber 12 is therefore substantially sealed from the air and as it collects therein it gravitates downwardly through the open valve 38 to the subjacent discharge chamber 14. As this chamber is also sealed, adhesive discharged therefrom through the conduit 62 reaches the applicator without contamination. Discharge is effected by rotating the valve spindle 80 to admit air from the pressure line 84 to the backside of the diaphragm 70 which collapses the diaphragm, displacing it upwardly. Upward displacement of the diaphragm increases the pressure within the chamber 14 thereby closing the valve 38 and opening the valve 54 so that cement is forced outwardly through the port 50 and the conduit 62. When the valve 76 is rotated to a closed position the residual pressure behind the diaphragm leaks out through the bleeder orifice 86 thus allowing the natural resilience of the diaphragm 72 to return the diaphragm to its initial extended position thereby lowering the pressure within the chamber 14. Displacement of the diaphragm downwardly creates a vacuum within the chamber thereby closing the valve 54 and opening the valve 38. When the valve 54 is closed there will be no further pressure on the cement in the conduit 62 so that drip is prevented at the applicator nozzle. Preferably, the walls and bottom of the discharge chamber are heated by a coil 88 to keep the adhesive therein liquid independently of the heating coils provided in the pot 10.

Under some conditions of use where the amount of adhesive used does not exceed that melted or the machine with which the pot is used is idle and the pot left heating the entire body of adhesive may become liquid, and it is within the contemplated use of the apparatus to use it not only for progressively melting the adhesive as described above but also to maintain a melted body of adhesive in a liquid state for dispensing to a place of use with the least amount of contamination from air.

The specific arrangement of the chambers 10, 12 and 14 and their assembly is not intended to be limiting nor is it intended that the invention shall be limited to supplying the adhesive in a container 90 as described, for it is possible to place the adhesive in the melting pot without benefit of a container. The disadvantage of the container, however, is that cleaning the melting pot is made more difficult since the melted adhesive must be scraped from the walls whereas if the container 90 is used when the adhesive is completely melted the container may be removed thus leaving the walls of the pot clean and ready for reception of another charge of cement.

It should be understood that the present disclosure is for the purpose of illustration only and that this invention includes all modifications and equivalents which fall within the scope of the appended claims.

I claim:

1. Apparatus for use in supplying melted adhesive to an applicator nozzle, comprising a receptacle having vertically arranged chambers, a top one containing a body of adhesive for melting, an intermediate one containing melted adhesive and a bottom one containing melted adhesive, said top and intermediate chambers having a wall therebetween in which there are a plurality of perforations through which adhesive melted from the body of adhesive in the top chamber gravitates to the intermediate chamber, said intermediate and bottom chambers having an imperforate wall therebetween in which there is a check valve adapted to gravitate to an open position to permit adhesive in the intermediate chamber to flow from it into the bottom chamber, a second check valve in the bottom chamber located near the bottom normally biased to prevent discharge of adhesive from the bottom chamber, a diaphragm overlying said port, said bottom chamber also having a port in its wall, a conduit including an air valve connecting to the port to a source of air pressure and a bleeder orifice in the valve, said diaphragm being inwardly displaceable by admission of pressure through the air valve to the port to displace adhesive within the chamber and hence to force it out through the second-named check valve, said diaphragm elastically resisting displacement and being operative to return to its initial position when the air valve is closed.

2. Apparatus for use in supplying melted adhesive to an applicator nozzle, comprising top, intermediate and bottom chambers divided by transverse walls, said top chamber being adapted to receive a solid block of adhesive and having at its bottom a plurality of openings in communication with the intermediate chamber, means associated with the walls of the top chamber for supplying heat thereto to melt the block at its bottom and sides to cause liquid adhesive to form at the walls and flow downwardly through the openings in the bottom of the chamber into the intermediate chamber, a check valve in the wall between the intermediate and bottom chambers permitting gravitational flow of liquid adhesive from the intermediate chamber into the bottom chamber, a second normally closed check valve in the bottom chamber through which adhesive may be forced by raising the pressure within the bottom chamber, a diaphragm in the bottom chamber operable by displacement to raise the pressure within the chamber, and means including an air valve for supplying air under pressure to displace the diaphragm and a bleeder orifice for releasing the pressure behind the diaphragm when the air valve is closed.

3. Apparatus for use in supplying melted adhesive to an applicator, comprising a melting pot, a collecting chamber and a discharge chamber, said melting pot being adapted to receive a solid block of thermoplastic adhesive corresponding in shape to the pot and to be heated progressively to melt the surfaces of the block having contact with the walls of the chamber without melting the entire block, a plurality of openings in the melting pot for allowing adhesive melted in the melting pot to flow into the collecting chamber and to accumulate therein, a normally open valve located between the collecting chamber and the discharge chamber through which the liquid adhesive in the collecting chamber will flow into the discharge chamber, a normally closed valve located in the discharge chamber through which the adhesive therein may be forced by raising the pressure within the discharge chamber, which pressure will simultaneously close the normally open valve, a normally expanded bellows type diaphragm located in the discharge chamber, means including a port and air valve for supplying air under pressure to the bellows to collapse it and by displacement of adhesive within the discharge chamber to raise the pressure therein, and a vent orifice in the air valve for bleeding the residual air pressure behind the bellows when the air valve is closed.

4. In combination with a container having top, bottom and side walls, a normally open inlet valve and a normally closed discharge valve, a diaphragm pump for ejecting liquid adhesive therefrom through the discharge valve, said pump including a housing within the container, said housing having an open side in communication with the interior of the container, a normally expanded bellows tube mounted within the housing with an end secured across the open side of the housing and its opposite end adjacent the opposite wall of the housing, a diaphragm carried by the oppsite end of the tube, one side of which is exposed to the interior of the container and the other to the interior of the housing, a conduit connected to the housing, said conduit passing through the wall of the container and a valve connecting the conduit to a source of air pressure, said valve including a bleeder orifice.

5. In combination with a container having top, bottom and side walls, a normally open inlet valve and a normally closed discharge valve, a diaphragm pump for ejecting liquid adhesive therefrom through the discharge valve, said pump including a diaphragm located in the container, one side of which is exposed to the interior of the container and the other of which is excluded therefrom, means including an air valve for supplying air under pressure to the side of the diaphragm excluded from the interior of the container to displace the diaphragm, means tending to restore the diaphragm to its initial position and a bleeder orifice associated with the air valve to release the residual pressure when the air valve is closed, said check valves operating upon displacement of the diaphragm to close the one and open the other and upon return of the diaphragm to its initial position to open the one and close the other.

References Cited in the file of this patent

UNITED STATES PATENTS

| 838,658 | Silvera | Dec. 18, 1906 |
| 1,780,336 | Canton | Nov. 4, 1930 |
| 2,021,580 | Osgood | Nov. 19, 1935 |

FOREIGN PATENTS

| 4,941 | Great Britain | July 29, 1915 |

UNITED STATES PATENT OFFICE

CERTIFICATE OF CORRECTION

Patent No. 2,809,772

October 15, 1957

Thomas A. Weisz

It is hereby certified that error appears in the printed specification of the above numbered patent requiring correction and that the said Letters Patent should read as corrected below.

Column 4, line 22, strike out "a diaphragm overlying said port," and insert the same after "wall," in line 23; same line 23, strike out "also"; line 24, strike out "to", first occurrence.

Signed and sealed this 24th day of December 1957.

(SEAL)
Attest:

KARL H. AXLINE
Attesting Officer

ROBERT C. WATSON
Commissioner of Patents